(12) United States Patent
Dock et al.

(10) Patent No.: US 10,701,296 B2
(45) Date of Patent: Jun. 30, 2020

(54) THERMAL CAMERA WITH IMAGE ENHANCEMENT DERIVED FROM MICROELECTROMECHANICAL SENSOR

(71) Applicant: RPX Technologies, Inc., Stillwater, OK (US)

(72) Inventors: Matthew Dock, Stillwater, OK (US); Michael Fox, Stillwater, OK (US); Jon Stewart, Stillwater, OK (US)

(73) Assignee: RPX Technologies, Inc., Stillwater, OK (US)

( * ) Notice: Subject to any disclaimer, the term of this patent is extended or adjusted under 35 U.S.C. 154(b) by 0 days.

(21) Appl. No.: 16/164,528

(22) Filed: Oct. 18, 2018

(65) Prior Publication Data

US 2019/0116328 A1    Apr. 18, 2019

Related U.S. Application Data

(60) Provisional application No. 62/574,034, filed on Oct. 18, 2017.

(51) Int. Cl.
*H04N 5/33* (2006.01)
*H04N 5/365* (2011.01)
*G01J 5/10* (2006.01)
*G01J 5/08* (2006.01)
*G01J 5/00* (2006.01)

(52) U.S. Cl.
CPC .......... *H04N 5/3656* (2013.01); *G01J 5/0853* (2013.01); *G01J 5/0862* (2013.01); *G01J 5/10* (2013.01); *H04N 5/33* (2013.01); *G01J 2005/0077* (2013.01)

(58) Field of Classification Search
CPC ..... H04N 5/3656; G01J 5/0853; G01J 5/0862
See application file for complete search history.

(56) References Cited

U.S. PATENT DOCUMENTS

| | | | |
|---|---|---|---|
| 7,795,578 B2 | 9/2010 | Hogasten et al. | |
| 7,881,495 B2 | 2/2011 | Williams et al. | |
| 2008/0252736 A1* | 10/2008 | McLeod | H04N 5/23248 348/208.99 |
| 2018/0176466 A1* | 6/2018 | Griffis | H04N 5/23238 |

* cited by examiner

*Primary Examiner* — Hugh Maupin
(74) *Attorney, Agent, or Firm* — Dunlap Codding, P.C.

(57) ABSTRACT

A camera system and methods of enhancing images using direct measurement of angular displacement are disclosed. The camera system includes an optical element, a focal plane array (FPA), a motion sensor and a processor. The FPA has pixels sensing image pixel data from the optical element. The pixels have an angular resolution dependent upon a configuration of the optical element and a dimension of the pixels. The pixels detect electromagnetic waves having a wavelength within a range from 800 nanometers to 20 micrometers. The motion sensor senses angular displacement in 3D. The processor receives the image pixel data generated at distinct first instants of time during an image capture period from the FPA and motion reading(s) during the image capture period, converts the motion readings into angular displacement of the FPA, and selects an image processing algorithm to generate at least one image enhancement for the image pixel data.

20 Claims, 5 Drawing Sheets

|  | Col. 1 | Col. 2 | | Col. n |  |
|---|---|---|---|---|---|
| Row 1 | $PV_{1,1}$ | $PV_{1,2}$ | $\cdots$ | $PV_{1,n}$ $\longrightarrow$ | $\dfrac{PV_{1,1}+PV_{1,2}\cdots+PV_{1,n}}{n}$ |
| Row 2 | $PV_{2,1}$ | $PV_{2,2}$ | $\cdots$ | $PV_{2,n}$ | |
| | $\vdots$ | $\vdots$ | | $\vdots$ | |
| Row M | $PV_{m,1}$ | $PV_{m,2}$ | $\cdots$ | $PV_{m,n}$ | |

THERMAL CAMERA WITH IMAGE ENHANCEMENT DERIVED FROM MICROELECTROMECHANICAL SENSOR

INCORPORATION BY REFERENCE

The present patent application claims priority to the provisional patent application identified by U.S. Ser. No. 62/574,034 filed on Oct. 18, 2017, the entire content of which is hereby incorporated by reference.

STATEMENT REGARDING FEDERALLY SPONSORED RESEARCH OR DEVELOPMENT

This invention was made with government support under contract numbers W909MY-17-C-0015 awarded by the Department of the Army. The government has certain rights in the invention.

FIELD OF THE DISCLOSURE

The disclosure generally relates to systems that provide image enhancements derived from motion data obtained from a micromechanical sensor. More particularly the disclosure relates to systems and methods that determine an angular resolution for pixels within an image sensor array, and use motion data indicative of angular displacement of the image sensor to provide at least one enhancement to an image.

BACKGROUND

Choosing a camera for a particular application typically involves a combination of selecting and compromising desirable traits. A wide field-of-view (FOV) can improve image context, can broaden information content, and, when stabilizing video or emphasizing a particular area of interest, can allow flexibility for cropping. Higher spatial resolution images can reduce pixelation and resolve additional detail for a particular field of view. Lower-noise images can provide a higher-fidelity representation of the scene. And in video systems where control is involved, higher frame rates and lower latency can improve system controllability in closed-loop control systems and can improve response time in other situations.

Although most camera systems detect visible light, other detector wavelengths, especially near IR, SWIR, MWIR, and LWIR also provide useful information. Although visible camera systems are most common, thermal-imaging camera systems (MWIR and LWIR) have significant potential for use in new applications. Small mobile electronic devices, such as handheld instruments, cell phones, and unmanned aircraft, can all benefit from thermal imaging, provided they are available at acceptably small size, low weight, low power, low cost, and with acceptable image quality.

For each desirable camera trait, there may be a number of negative-impact tradeoffs or limitations to be considered or managed. For example, focal plane array manufacturers have migrated to higher pixel counts to improve image quality, but this typically increases the size, weight, power, and cost, limiting their availability for these new markets. Camera size and weight increase dramatically with pixel count since size and weight generally increases to the third power of pixel size, AFOV, and inverse IFOV.

$$\text{Size \& Weight} \propto [\text{pixel size} * \text{AFOV/IFOV}]^3 \qquad [\text{Eq. 1}]$$

Widening the angular field-of-view (AFOV) can decrease spatial resolution (image detail) and increase lens and system size, weight, and complexity. In order to maintain spatial resolution (e.g., instantaneous field of view (IFOV)) as the AFOV is increased, the number of pixels in the detector array must be increased which typically increases detector and system size, weight, power, and cost. There are also state-of-the-art technological and commercial/manufacturing limitations in regard to maximum detector size, total detector pixel count, and pixel pitch.

Efforts have been made in the past to stitch two or more images together to form a composite image having a large field of view than the angular field of view of the camera. Conventional techniques involve locating a common feature in a first and second image using image analysis, and then optically aligning and overlaying the first and second images. Identifying a common feature in multiple images, optically aligning the multiple images, and overlaying the multiple images is a computationally intensive process.

Higher spatial resolution images imply narrower per-pixel IFOV and may increase lens-design complexity, size, weight, and manufacturing costs. This will also typically increase camera system size, weight, power, and cost. Image noise may also be increased. There are also physics limits dependent on the wavelength of the imaged light where the effective spatial resolution becomes diffraction limited.

Generating uniform lower-noise images may increase camera system size, weight, power, and cost or may reduce spatial resolution and/or field of view. In addition, lower-noise high-fidelity images may require increased exposure time or otherwise reduce image throughput due to periodic or as-needed collection of sensor-mapping data for non-uniformity correction (NUC). For thermal cameras, this might involve mechanical shutters or a scene-based non-uniformity correction (SB-NUC). Mechanical shutters increase the mechanical complexity and typically decrease reliability. A SB-NUC does not require additional mechanical systems, but may dramatically increase processing complexity, power dissipation, and impose operational constraints.

Higher frame rates and low latency, dependent on how this is accomplished, may increase cost, reduce spatial resolution, or increase noise. Size, weight, power, and cost may increase with the required increases in processing and bandwidth. For thermal cameras, there may be export controls, arms regulations, or other regulatory restrictions based on the maximum frame rate (and resolution). Performance of thermal imaging cameras may also be limited by the detector's thermal time constant. Increasing the frame rate will also increase the power requirements and may increase self-heating. Self-heating can degrade the image quality or, if active cooling is needed, can dramatically increase power and weight requirements.

What is desired, however, is to be able to improve a camera system's field of view, image resolution, image uniformity, frame rate, without increasing the camera system's size, weight and power requirement. It is to such an improved camera system that the present disclosure is directed.

SUMMARY

A camera system, comprising a focal plane array, a motion sensor, and a processor is described. The focal plane array has a plurality of adjacently disposed sensors sensing image frames on a per-pixel basis at a first frame rate. The plurality of adjacently disposed sensors has a known angular resolution (e.g., on a milli-radian basis) between pixels. The motion sensor is rigidly connected to the focal plane array such that movement of the focal plane array matches movement of the motion sensor. The motion sensor senses angular displacement in three dimensions and provides motion data indicative of the angular displacement (e.g. measured in milliradians/second) of the motion sensor at distinct instants of time (referred to herein as a "motion detection rate"). If the time lapsed between the capture of two image frames (or pixel subsets thereof) is known, then the distance that the focal plane array has moved can be directly measured. The resolution, i.e., directly measured distance, can be less than the known angular resolution of the focal plane array. The motion sensor may be a micromechanical sensor including a gyroscope to sense and provide signals indicative of angular displacement in three dimensions. As will be discussed below, this motion data permits a direct measurement of rotation and translation of the pixels of the focal plane array (on a sub-pixel basis) and the scene being converted by the focal plane array into image data thereby permitting image enhancements without conducting conventional image analysis. In one embodiment, the processor assigns at least one set of motion data with each of the image frames, and then uses a plurality of the image frames, and the angular displacement of a series of a first one of the image frames relative to a second one of the image frames to generate a composite image having an image enhancement. In other embodiments and depending upon the construction of the focal plane array, the processor may assign at least one set of motion data to a pixel or a group of pixels within the focal plane array, and then use the pixels or group of pixels, and the angular displacement of the series of a first pixel (or group of pixels) relative to a second pixel or group of pixels to generate a composite image. For example, in some embodiments, the composite image can be enhanced based on individual rows or individual columns in the focal plane array.

As will be described below, the image enhancements possible by using direct measurement of angular displacement of the focal plane array include a larger field of view by stitching together displaced (e.g., shifted) image frames, increased image resolution by overlaying overlapping parts of displaced image frames showing the same scene (e.g., focal plane array of 320×240, image resolution can be 640×480), increased image uniformity by calibrating the gain and/or offset of each image pixel separately using at least one of a plurality of multiple modes selected by a magnitude of the motion data, and enhanced frame rate by transmitting an image frame with multiple motion data whereby a video for a video time period can be rendered upon receipt of and interpretation of the image frame and the multiple motion data as discussed below. This allows the use of a relatively smaller focal plane array, thereby reducing cost, size and weight requirements of the camera system. Further, using the angular displacement of a first one of the image frames relative to a second one of the image frames to generate the image enhancement in the composite image or video greatly reduces the computation requirements of the processor to generate the composite image or video. This permits the use of a smaller, and less powerful processor thereby lowering the weight, and power requirements involved in creating the composite image or video. With respect to video, transmitting an image frame with multiple motion data for a video time period as discussed herein greatly enhances a virtual frame rate that can be achieved without increasing or even reducing required transmission bandwidth. Thus, the present disclosure describes a camera system that solves technical problems, and also improves the functionality of the processor in generating the composite image or video.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The present disclosure describes systems and methods for a camera system that reduces weight and increases processing efficiency by converting electromagnetic waves into image pixel data at multiple discrete first instants of time during an image capture period with a focal plane array, and tracks angular displacement of the focal plane array of the camera system at multiple discrete second instants of time during the image capture period with a motion sensor, and uses the image pixel data and the angular deviation data to generate various image enhancements discussed below. The present disclosure may generate the various image enhancements without the use of any image analysis, such as stereo photogrammetry, triangulation, bundle adjustment or feature detection. This results in an improved camera system that can be made to weigh less and use more efficient computational algorithms than conventional camera systems.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" (also represented as the symbol "I") refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term AFOV—Angular Field of View, as used herein refers to a full angle of one dimension (horizontal, vertical, or diagonal, typically whichever is wider) of an active area of a focal plane array when used in combination with a specified optical element, such as a lens. The Angular Field of View is typically reported in degrees.

The term IFOV—Instantaneous Field of View, as used herein refers to a solid angle through which a particular detector element (pixel sensor) in combination with the optics used, is sensitive to electromagnetic radiation. Instantaneous Field of View is typically reported in milliradians (mrad). Although the IFOV of individual pixels often vary across the focal plane array based on the light angle of incidence, for simplification the IFOV of a single foveal pixel is often reported as being representative of the entire array.

The term Pixel Size, as used herein refers to a dimensional width of a single pixel.

The term "angular resolution of a pixel" or a "pixel having an angular resolution" as used herein refers to the angular field of view of a dimension of the focal plane array, divided by the number of pixels in the dimension.

Figure 1:
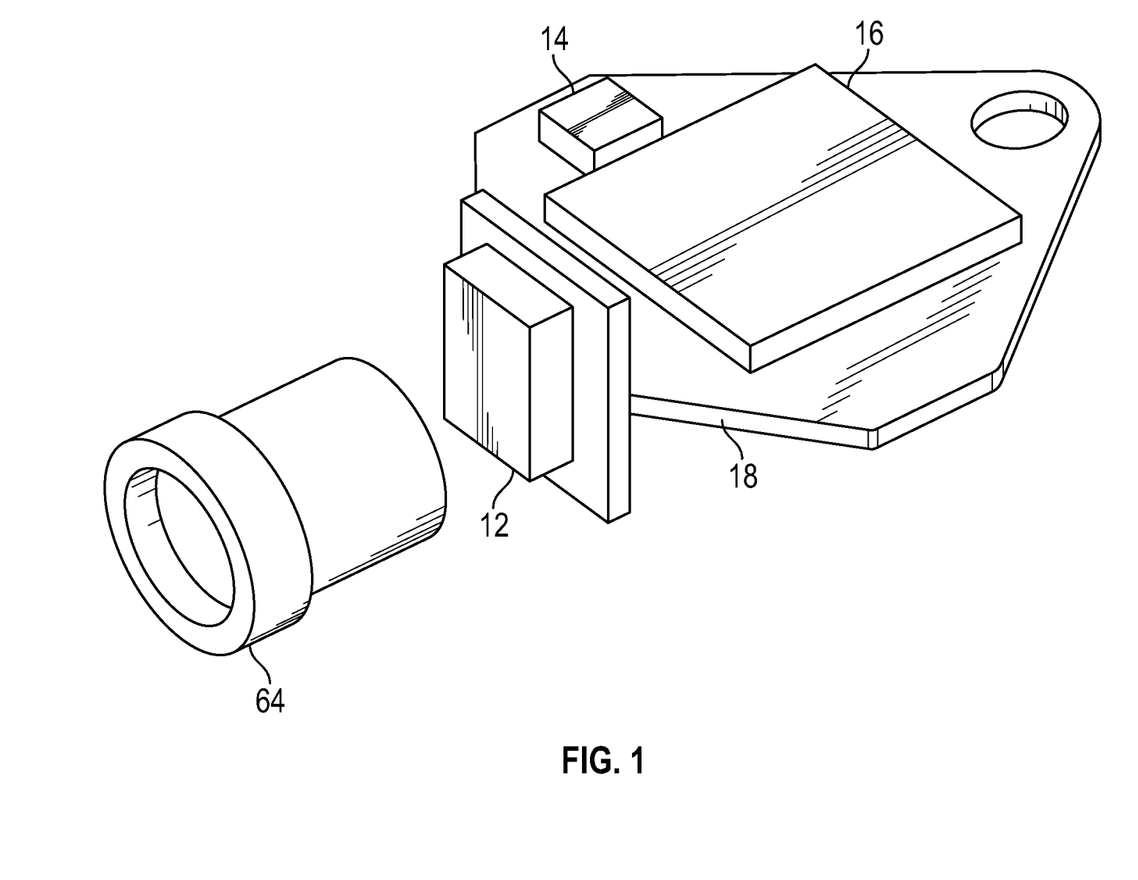
FIG. 1 is a diagrammatic, perspective view of an exemplary camera system constructed in accordance with the present disclosure.
Figure 2:
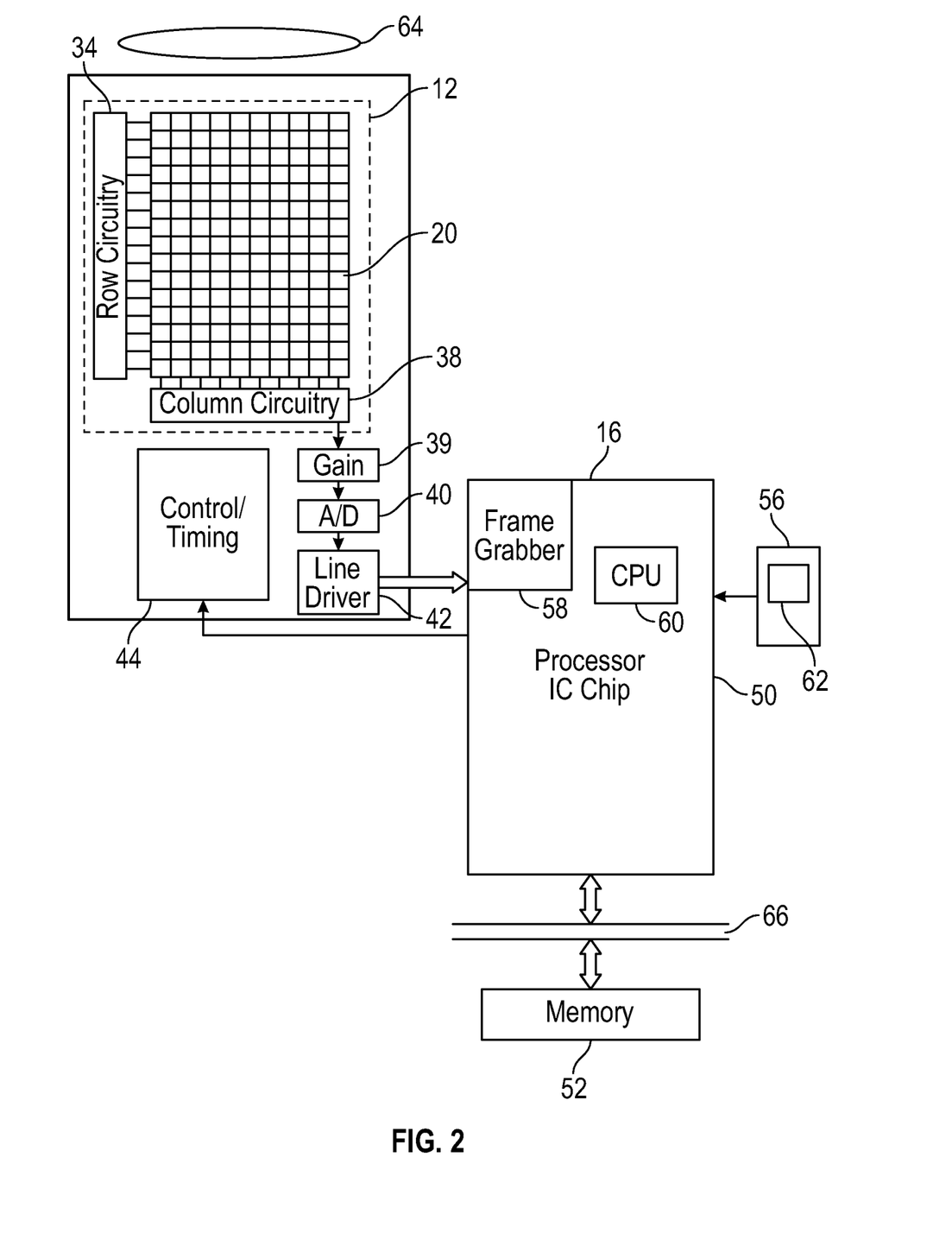
FIG. 2 is a block electrical diagram of one embodiment of the camera system constructed in accordance with the present disclosure.

Referring now to the drawings, and in particular to FIGS. 1 and 2, shown therein is a camera system 10, comprising a focal plane array 12, a motion sensor 14, and a processor 16. The focal plane array 12 has a two-dimensional array of pixels 20 (e.g., plurality of adjacently disposed sensors) sensing image frames 22 (three image frames 22a, 22b, and 22c being shown in FIG. 5 by way of example) on a per-pixel basis at a first frame rate. Each of the pixels 20 includes an optical sensor (not shown) to sense light within a particular range of wavelengths. For example, the optical sensors can be configured to detect visible light, or other wavelengths, such as near infrared, short wave infrared, medium wave infrared, long wave infrared, or ultraviolet. The term "infrared" as used herein refers to a portion of the electromagnetic spectrum having wavelengths between 800 nanometers and 20 micrometers.

The pixels 20 have a known angular resolution (e.g., on a milli-radian basis) between pixels. The focal plane array 12 is configured to be moved, and convert electromagnetic information into image pixel data at multiple discrete first instants of time during an image capture period. Movement of the image plane array 12 can be provided by a variety of mechanisms. For example, the image plane array 12 may be supported by an unmanned aerial system that moves due to 1) planned navigation from a first location to a second location, and 2) unplanned angular deviations due to wind or other forces (e.g., vibration) acting upon the unmanned aerial system. In other embodiments, the image plane array 12 can be connected to a guide to move the image plane array 12 in a planned path during the image capture period.

The motion sensor 14 is rigidly connected to the focal plane array 12 such that movement of the focal plane array 12 matches movement of the motion sensor 14. For example, the focal plane array 12 and the motion sensor 14 can be rigidly mounted on a mechanical support mechanism 18. The mechanical support mechanism 18 has sufficient mechanical strength so that the focal plane array 12 moves with the motion sensor 14. The mechanic support structure of sufficient rigidity to provide accurate motion sensing to less than the angle of the pixel IFOV. The mechanical support mechanism 18 can be connected to a ground based vehicle (e.g., truck, car, motorcycle, or the like), an aircraft (including a helicopter, a multiple rotor helicopter (e.g., quad copter, hex copter, etc.), fixed wing aircraft or the like). The motion sensor 14 senses angular displacement in three dimensions and provides motion data indicative of the angular displacement of the motion sensor 14 at distinct instants of time (referred to herein as a "motion detection rate") and at an angular resolution that is less than the known angular resolution of the pixels 20 in the focal plane array 12. The motion sensor 14 may be a micromechanical sensor including a gyroscope to sense and provide signals indicative of angular displacement in three dimensions. Optionally, the motion sensor 14 may have a plurality of accelerometers to detect translation, i.e., to determine how far the motion sensor 14 has moved in a particular direction, and/or a magnetic sensor to determine an absolute heading or reference direction. In some embodiments, the motion sensor 14 may not have any mechanism to determine a real world location of the motion sensor 14. Rather, the motion sensor 14 may be configured to determine relative changes in position of the motion sensor 14, such as angular displacement in three dimensions at distinct instants of time.

The processor 16 communicates with and receives the motion data from the motion sensor 14, and the image pixel data, e.g., image frames 22, from the focal plane array 12. The processor 16 assigns at least one set of motion data with each of the image frames 22, and may then use a plurality of the image frames 22, and the angular displacement of a series of a first one of the image frames relative to a second one of the image frames to generate a composite image 24 or video having an image enhancement. In some embodiments, the processor 16 solely uses the data indicative of the angular displacement provided by the motion sensor 14 to enhance the image frames 22 without using a set of tie points in the image frames 22, and also without detecting a location of any particular object within the image frames. In these embodiments, the image enhancements can be made without using conventional image processing techniques for georeferencing, or determining location of an object in three-dimensional space, such as aero-triangulation, stereo photogrammetry, or bundle adjustment. In fact, the location of the focal plane array 12 in three dimensional space may not be used in the image enhancement techniques described herein. Of course, the camera system 10 may also include a Global Positioning System, or the like, to determine the location of the focal plane array 12 in real-world coordinates for use in interpreting information within the composite image 24.

In one embodiment, the processor 16 receives the image pixel data generated at distinct first instants of time during an image capture period from the focal plane array 12 and motion reading(s) during the image capture period, converts the motion readings into angular displacement of the focal plane array 12, and selecting one or more image processing algorithms to generate at least one image enhancement for the image pixel data based upon the angular displacement of the focal plane array during the image capture period. Some of the image enhancements discussed herein including, but not limited to, enhanced field of view, super resolution, and enhanced frame rate function optimally when the focal plane array 12 is moving, but at a relatively slow rate. Further, some of the image enhancements function optimally when the focal plane array 12 is moving in certain patterns, such as oscillating back and forth. Depending upon the magnitude of the angular displacement and/or the direction of the angular displacement, a particular image processing algorithm can be selected.

The processor 16 may include hardware, such as a central processing unit, an application specific integrated circuit (ASIC), or a field programmable gate array (FPGA), or a combination of hardware and software. Software includes one or more computer executable instructions that when executed by one or more component (e.g., central processing unit) causes the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. The processor 16 may include only one processor, or multiple processors working together to perform a task. The processor 16 can be located adjacent to the focal plane array 12 and the motion sensor 14, and communicate with the focal plane array 12 and the motion sensor 14 via any suitable mechanism, such as a printed circuit board, for example. Or, the processor 16 can be located remotely from the focal plane array 12 and the motion sensor 14, and receive the image pixel data and the motion data via a network. The network may be a wired network, a wireless network, an optical network, or combinations thereof.

As will be described below, the image enhancements may include a larger field of view, increased image resolution, increased image uniformity, and enhanced frame rate. This allows the use of a relatively smaller focal plane array 12, thereby reducing cost, size and weight requirements of the camera system 10. Further, using the angular displacement of a first one of the image frames 22 relative to a second one of the image frames 22 to generate the image enhancement in the composite image 24 or video greatly reduces the computation requirements of the processor 16 to generate the composite image. This permits the processor 16 to be a smaller, and a less powerful processor thereby lowering the weight, and power requirements involved in creating the composite image 24. Thus, the camera system 10 solves technical problems, and also improves the functionality of the processor 16 in generating the composite image 24.

A specific embodiment of the focal plane array 12 and the processor 16 are shown in FIG. 2 by way of example. In the embodiment of FIG. 2, the focal plane array 12 has a two-dimensional array of pixels 20. The pixels 20 can be implemented in a variety of manners depending upon the wavelengths of light that are intended to be detected. For example, when it is desired for the pixels 20 to sense visible light, the pixels 20 may be incorporated onto an integrated circuit (IC) chip 30. When it is desired for the pixels 20 to sense infrared light, the pixels 20 may be implemented as micro bolometers integrated onto an integrated circuit chip. The focal plane array 12 may be adapted to operate without a mechanical shutter, in a global shutter operating mode or a rolling shutter operating mode. In the global shutter operating mode, each pixel 20 is exposed simultaneously at the same instant in time, and can be read simultaneously. In the rolling shutter operating mode, each row of pixels 20 is exposed and read separately. The focal plane array 12 may also have an on-chip row circuitry 34 and column circuitry 38. Row circuitry 34 and the column circuitry 38 may enable one or more various processing and operational tasks such as addressing pixels, decoding signals, amplification of signals, analog-to-digital signal conversion, applying timing, read out and reset signals and the like. The focal plane array 12 may also include an amplifier 39, an analog-to-digital conversion circuit 40 and a line driver circuit 42, which generates a multi-bit (e.g., 8 bit or 10 bit) signal indicative of light incident on each pixel 20 of the focal plane array 12. The output of the line driver 42 may be presented on a set of output pins of an integrated circuit. The focal plane array 12 may also include a timing/control circuit 44 which may include such components as a bias circuit, a clock/timing generation circuit, and an oscillator.

The processor 16 may be co-located with, or remote from the focal plane array 12. The processor 16 may include a main processor IC chip 50, memory array 52, and actuation module 56. Main processor IC chip 50 may be a multifunctional IC chip having an integrated frame grabber circuit 58 and a central processing unit (CPU) 60. The focal plane array 12, the motion sensor 14, the processor 16, and the memory array 52 may be integrated into a single component. The actuation module 56 may generate a trigger signal that initiates a capture process in which multiple image frames are captured and stored in the memory array 52 for use in generating the composite image 24. The actuation module 56 may include an actuator 62, that may be a manually actuated trigger, or a software program that receives an instruction to cause the capture of multiple image frames 22 and motion data for generating the composite image 24. The camera system 10 further includes at least one optical element 64. The optical element 64 can be any device configured to direct and/or focus the electromagnetic waves onto the focal plane array 12, such as a lens, mirror(s), pin-hole or combinations thereof.

The memory array 52 may include a non-transitory memory device, such as a RAM, EPROM, or flash memory. The memory array 52 may be in communication with the processor IC chip 50 via a system bus 66.

Figure 3:
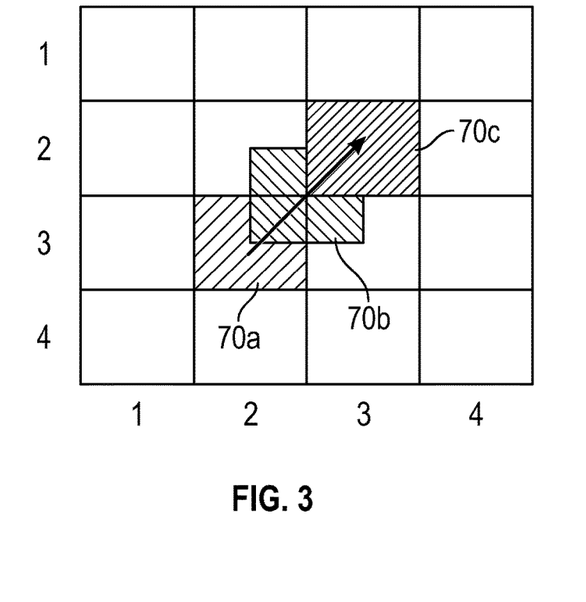
FIG. 3 is a diagrammatic view of a portion of a focal plane array of the exemplary camera system showing pixels sensing an object during a period of movement of the focal plane array in accordance with the present disclosure.

Shown in FIG. 3 is an exemplary 4×4 matrix of pixels 20 of the focal plane array 12 in which an object 70 is shown as being detected by the pixels 20 at three instants of time. This is represented using the notations 70a, 70b and 70c. In this example, the object 70 was detected in pixel 20 at location (2,3) at the first instant of time, as represented by the reference numeral 70a. At the second instant of time, the object 70 was detected in pixels 20 at a location half way between the pixel location (2,3) and the pixel location (3,2) as represented by the reference numeral 70b. At the third instant of time, the object 70 was detected in pixels 20 at pixel location (3,2) as represented by the reference numeral 70c. By knowing the angular resolution of the pixels 20 within the focal plane array 12, and the angular displacement of the focal plane array 12 as detected by the motion sensor 14, the relative locations in the focal plane array 12 where the same object 70 will be detected can be estimated. As will be discussed below, knowing the angular resolution of the pixels 20 within the focal plane array 12, and the angular displacement of the focal plane array 12 allows improvements to be made to the generated imagery.

Figure 4:
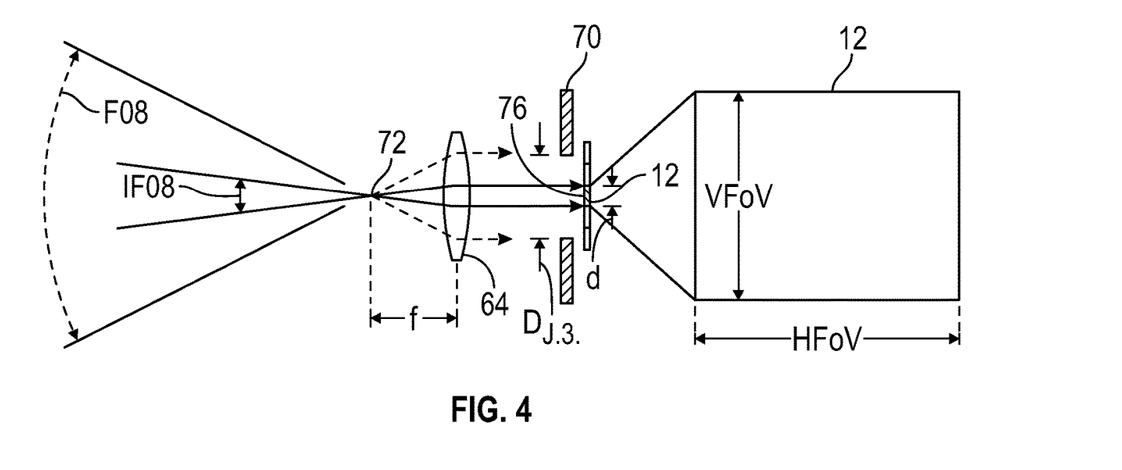
FIG. 4 is a diagrammatic view of an optical element and focal plane array (shown in side elevation and front elevation) of an exemplary camera system illustrating various dimensions that can be used to convert pixel displacement into an angular resolution in accordance with the present disclosure.

One methodology for determining the angular resolution of the pixels 20 is shown in FIG. 4. In particular, FIG. 4 is a diagrammatic view of the optical element 64 and the focal plane array 12 illustrating various dimensions that can be used to convert pixel displacement into an angular displacement (also referred to herein as an angular resolution) in accordance with the present disclosure. The field-of-view (FOV) of the camera system 10 is the range of angles from which the incident radiation can be collected by the focal plane array 12. The field of view may be decomposed into its horizontal and vertical dimensions, labeled as HFOV and VFOV respectively. The horizontal and vertical dimensions depend upon the size, and number of pixels 20 in the focal plane array 12. In both cases the FOV is determined by a combination of the focal length of a lens, f, and the size of a field stop, $D_{F.S.}$ The focal length f of a lens of the optical element 64 is the distance from the center of the lens to the point where all of the incident radiation (or light) coming from a source at infinity will be focused. If the source is at infinity (or very far away), the incident rays of radiation will be nearly parallel. The lens of the optical element 64 will refract them all to the same point, namely a focal point 74 of the lens. The field stop 70 is a device that blocks rays that are beyond its dimensions from reaching the focal plane array 12. The pixels 20 are located at a focal plane 76, which is usually not the same location as the focal point 74. The location of the focal plane 76 determines at what range objects will be brought into focus. The field stop 70 is located just before the focal plane 76. If there is no physical field stop, then the boundaries of the pixels 20 of the focal plane array 12 determine the field stop dimensions.

As can be seen from the geometrical construction in FIG. 4, the diameter of the field stop 70, $D_{F.S.}$ affects the FOV. If the field stop 70 is made smaller, the FOV will be reduced accordingly. By analogous reasoning, the instantaneous field-of-view (IFOV) will be affected by the size of the individual pixels 20. The IFOV is the range of incident angles seen by a single pixel 20 at the focal plane 76, and in the focal plane array 12. The IFOV and FOV can be calculated using trigonometry as set forth below in Equations 2 and 3.

$$IFOV = 2 \tan^{-1}\left(\frac{d}{2f}\right) \quad \text{Equation (2)}$$

$$FOV = 2 \tan^{-1}\left(\frac{D_{FS.}}{2f}\right) \quad \text{Equation (3)}$$

The field of view may be calculated as an angle. Dividing the field of view angle by the number of pixels in either the horizontal or vertical field of view (dimension) will provide the angular resolution, per pixel, of the focal plane array 12 for the particular horizontal or vertical field of view.

Figure 5:
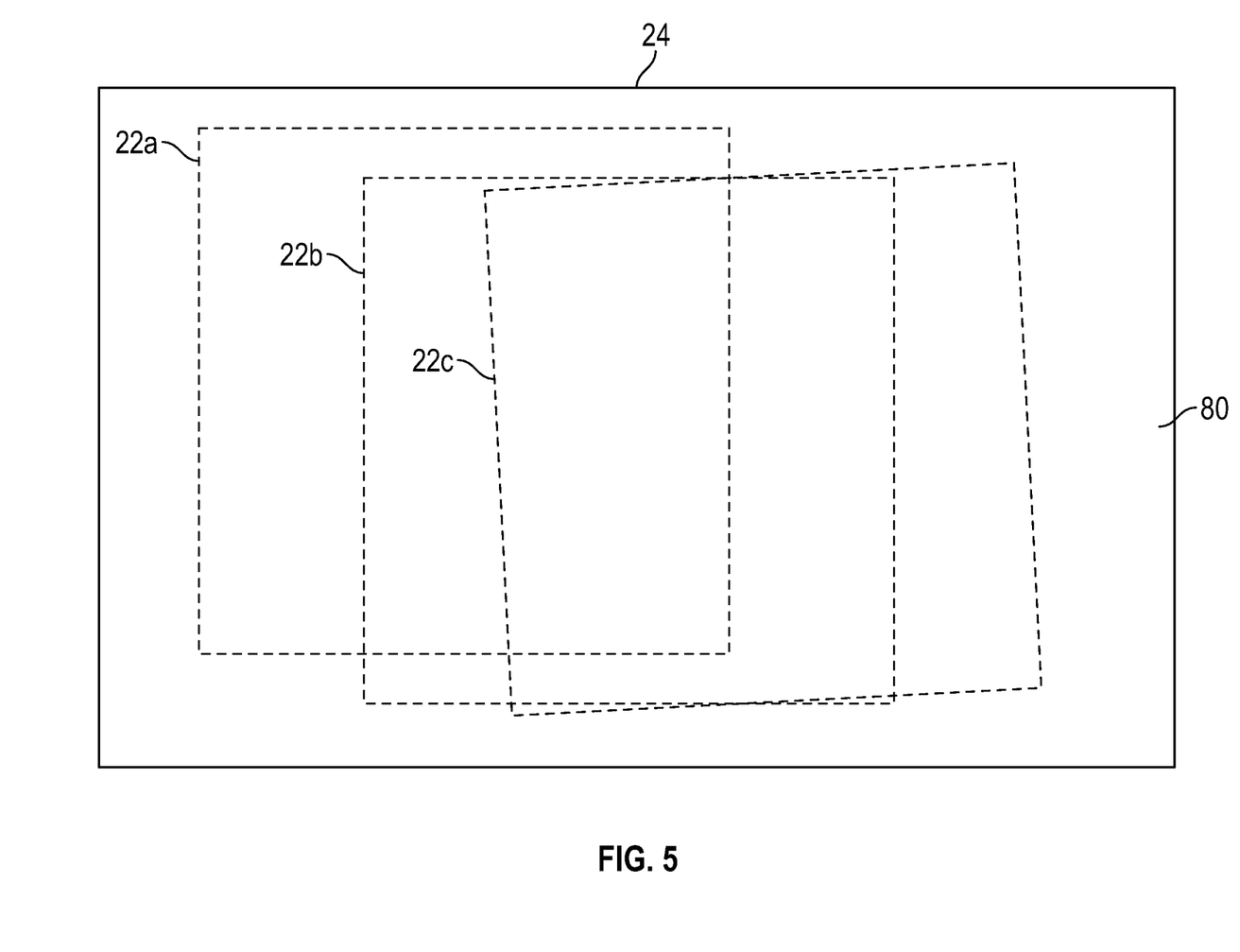
FIG. 5 is a diagrammatic view of a composite image formed from multiple reference frames in accordance with the present disclosure.

In one embodiment, the image enhancement discussed herein can result in a larger AFOV in either the horizontal and/or the vertical dimension. This can be accomplished, as shown in FIG. 5, by allocating a pixel map 80 in the memory array 52 for the composite image 24, and then stitching together the image frames 22 using the motion data indicative of the angular displacement of the focal plane array. The data from each pixel 20 in the image frame 22 can be positioned in the memory array 52 based on motion data from the motion sensor 16 to correspond to the scene-correlated coordinates in the memory array 52 representation of the scene. This allows successive frames stored in this memory array 52 to cover a scene area larger than the scene area captured by a single image frame 22 from the focal plane array 12. This has the effect of stitching together data from multiple frames 22 to generate an effective AFOV larger than a single frame 22 from the focal plane array 12. Therefore, this composite image 24 also has a higher pixel count without the need for a wider FOV lens or larger pixel-count focal plane array 12. Depending on the desired view, some or all of the data in the composite image 24 can be presented, although some of the pixels within the composite image 24 may be captured from another moment in time.

In another embodiment, the image enhancement discussed herein may be used to provide an enhanced IFOV, which is referred to herein as super resolution. Referring to FIG. 5, shows therein are the three exemplary image frames 22a, 22b, and 22c that are shifted or displayed relative to one another. By overlaying overlapping portions of the image frames 22a, 22b, and 22c on one another, the three image frames 22a, 22b, and 22c combined include more information than any of the individual image frames 22a, 22b, or 22c. Super resolution relies on the aliased scene caused by an undersampled system. Super-resolution narrows the apparent IFOV of the composite image 24, thus improving the IFOV without the weight penalty as predicted in the previous equation [eq. 1]. For instance, a typical microbolometer with a 12 μm pixel and a 12 mm focal length will have a 1 milliradian IFOV. With a 0.1 milliradian resolution motion sensor 14, the pixel image is known to $\frac{1}{10}$th the pixel pitch. As the target in the scene moves across the focal plane array 12 image, its true position is known and the high frequency detail can be reconstructed.

Super-resolution is usually achieved by analyzing features in temporally-adjacent images to determine the position shift between frames to sub-pixel accuracy, then mathematically combining the translated new image with upscaled historical images. Using the motion data from the motion sensor 14 (i.e. Mems-Gyros & Accelerometers), the processor 16 can determine frame-to-frame pixel translation with sub-pixel accuracy. Pixels for the translated new image can be determined from the overlaid frames using any suitable algorithm, such as an average or a weighted average which may include a temporal influence of the pixel values of the overlaid pixels. An example of a weighted average with a temporal influence would be to apply a greater weight to the newer image frames. This reduces or eliminates the need for image analysis to determine translation and enables super-resolution images to be generated with relatively low computational requirements.

Another image enhancement is a non-uniformity correction. Many imaging systems, such as microbolometer based imaging systems, exhibit fixed-pattern noise which affects the fidelity of generated images. Several methods can be used to reduce fixed-pattern noise. Two of the most common techniques include shutter based systems which determine image non-uniformity by analyzing inconsistencies in the flat-field image generated while staring at the closed shutter, and scene based nonuniformity correction which analyses moving versus stationary components of the image while the camera is in motion.

Compared to a shuttered system, a scene based NUC has better reliability and smaller size, weight, power, and cost. Additionally, the scene based NUC does not require a blackout period to view the shutter, a camera image is produced on every frame, allowing improved data collection. The non-changing elements of the scene combined with the motion of the focal plane array 12 (i.e., camera) relative to the scene allow a continuous non-uniformity correction over much shorter time periods.

Motion for scene-based NUC methods is usually estimated using computationally intense optical flow techniques that are corrupted by structured fixed-pattern noise. The structured noise becomes the dominate feature which interferes with the computation of the motion fields. One technique for resolving this is to base the motion on filtered images, however, filtered images reduce the accuracy of the motion estimation.

However, with a single or plurality of motion sensors 14 directly measuring the relative motion of the focal plane array 12 as in this disclosure, the image can be shifted and/or aligned in the memory array 52 of the processor 16 so that the image is maintained across different pixels in multiple frames. Because the non-uniformity is fixed on the image frame 22 and the scene and image motion is detected with the motion sensor 14, the processor 16 is able to use the difference between the fixed image (i.e., the non-uniformity that the processor 16 is eliminating) and the dynamic image (i.e., an image based upon the dynamic scene captured by the focal plane array 12 due to motion of the focal plane array 12) to calculate the gain and/or offset correction table or table adjustments for the individual physical pixels.

Increased image uniformity (i.e., removing undesired imaging artifacts from the image frame that is not a part of the desired scene to be imaged) can also be achieved by calibrating the gain and/or offset correction of each image pixel 20 separately using at least one of a plurality of multiple modes selected based upon a magnitude of the angular displacement between at least two image frames. For example, the processor 16 can be provided with image processing algorithms indicative of a first nuc mode used when the focal plane array 12 and the motion sensor 14 are stationary (when the angular displacement of the focal plane array 12 is less than a first threshold, which can be less than the angular resolution of the pixels), a second nuc mode used when the focal plane array 12 and the motion sensor 14 are moving relatively slowly (e.g., when the angular displacement is between the first threshold and a second threshold, and a third nuc mode used when the focal plane array 12 and the motion sensor 14 are moving at a high rate (e.g., above the threshold). For example, the first threshold can be between 0.1 and 1.0 of the angular resolution of the pixels and more preferably between 0.25 and 0.5 of the angular resolution of the pixels. The second threshold is above the first threshold. There are a variety of factors which can be used to determine the second threshold, including a thermal time constant of each pixel 20, the type of movement of the focal plane array 12 relative to the overall field of view of the focal plane array 12 and the pixel's angular resolution. In some embodiments, the processor 16 can be programmed to dynamically select and switch between the first nuc mode, the second nuc mode, and the third nuc mode for each image frame in a series of image frames to be non-uniformly corrected based upon the angular displacement of the focal plane array 12 at the instant of time when the particular image frame was captured.

Figure 6:
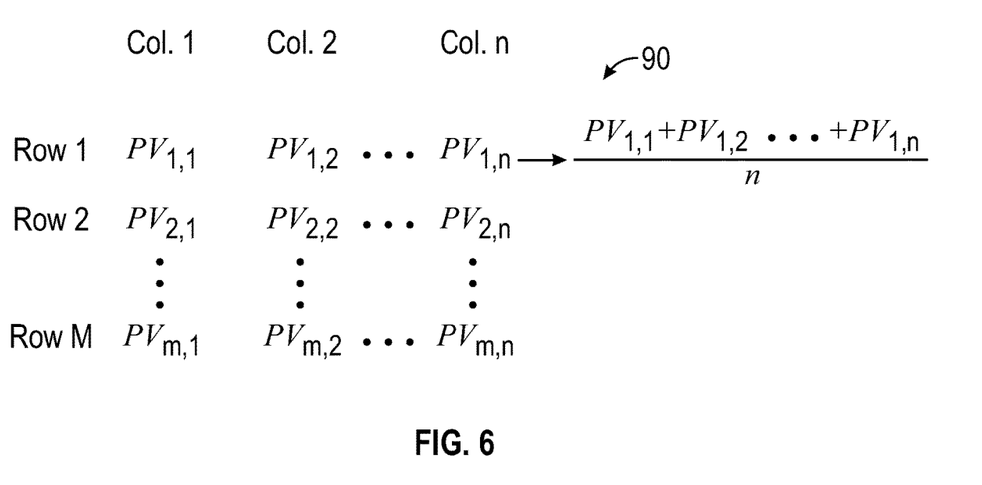
FIG. 6 is a diagrammatic view of pixel values within an image frame that can be analyzed and non-uniformly corrected in accordance with the present disclosure.

Shown in FIG. 6 is an image frame 90 for an m×n focal plane array 12 having m rows and n columns. The first nuc mode is based upon the assumption that adjacent rows or columns within the image frame 90 should have substantially the same average or median pixel value. Thus, the first nuc mode causes the processor 16 to calibrate the gain and/or offset correction by: 1) calculating an average or median pixel value of the pixel values for multiple adjacent and selected rows or columns within the image frame 90. For example, the average pixel values for rows 1, 2, and 3 can be calculated. If the average pixel value for row 2 is higher than the average pixel value for row 1, then the pixel values for row 1 can be increased, or the pixel values for row 2 can be decreased. Conducting this operation for all m rows within the image frame 90 can be used to calibrate the gain and/or offset correction in the image frame 90.

The second nuc mode is based upon the assumption that pixels of the focal plane array 12 that are detecting the same part of the scene in a series of image frames should have the same pixel value. Thus, if pixel $PV_{2,1}$ in the focal plane array 12 captures a detail within the scene in a first image frame, and the focal plane array 12 moves such that pixel $PV_{2,2}$ captures the same detail within the scene in a second image frame, then the pixel values $PV_{2,1}$ and $PV_{2,2}$ should be the same. If the pixel values $PV_{2,1}$ and $PV_{2,2}$ are different, then this is due to an undesired imaging artifact. Using direct measurement of angular displacement as described above, pixels that should show the same detail of the scene can be identified, and the pixel values can be normalized thereby eliminating unwanted artifacts.

The third nuc mode is based upon the assumption that at fast angular displacements, e.g., angular displacements above a threshold value, all of the pixels within the focal plane array 12 should be blurred by a same amount due to variations in the rapidly changing scene averaging out. The third nuc mode may calculate a single correction value and apply the single correction value to all pixels values in the image frame. In some embodiments, the single correction value can be calculated by obtaining the average (or median) value of all pixel values in multiple image frames. For example, this methodology can be applied to image frames captured during a time frame of 9-10 seconds, for example. Once the correction value has been calculated, then particular image frames can be non-uniformly corrected by subtracting the single correction value from each pixel value in the image frame. Once the correction value has been calculated for angular displacements above the threshold value, then the correction value can be stored in a table, and used to perform non-uniform correction on subsequent image frames captured when the angular displacement is above the threshold value.

In some embodiments, the image enhancement may include stabilization, rapid pan-tilt. This technique is capable of simulated pan and tilt and/or stabilization, where the displayed area of the stitched image (with AFOV potentially larger than a single FPA frame) is dynamically cropped based on the motion data in synchronization with desired pan-tilt and/or the movement of the focal plane array 12, but asynchronous to a new frame being acquired from the focal plane array 12. This enables rapid image motion of the displayed image, providing higher displayed frame rates than output from the focal plane array 12.

In some embodiments, the image enhancement may include increased frame rates and bandwidth reduction. By combining sensor data with historical images (both captured during an image capture period), the processor 16 is able to generate translated images that emulates the actual camera motion. Because the motion sensor 14 has a frame rate faster than the frame rate of the focal plane array 12, i.e, the motion sensor 14 responds faster than the focal plane array 12, image motion can be generated at higher frame rates allowing the frame rate to be increased with apparent motion. Additionally, by only transmitting a single frame and then multiple position offsets taken during an image capture period, framerates can be increased with a minimal effect on bandwidth by rendering the single frame into multiple frames of a video using the multiple position offsets. When it is determined that motion is occurring within the scene independent of any motion of the focal plane array 12, this motion can be highlighted using color, borders, or other optical modification of that area. Optionally, a subset of the stationary frame, containing the motion, may be transmitted at a lower bandwidth then the total of the new frame.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A camera system, comprising:
   at least one optical element;
   a focal plane array having a plurality of adjacently disposed pixels configured to sense image pixel data from electromagnetic waves supplied to the at least one optical element on a per-pixel basis, the plurality of adjacently disposed pixels having an angular resolution between pixels, the angular resolution being dependent upon a configuration of the at least one optical element and at least one dimension of the pixels, the pixels being configured to detect electromagnetic waves having a wavelength within a range from 800 nanometers to 20 micrometers;
   a motion sensor connected to the focal plane array such that movement of the focal plane array matches movement of the motion sensor, the motion sensor sensing angular displacement in three dimensions and providing motion readings indicative of the angular displacement of the motion sensor; and
   a processor receiving at least two image frames, the at least two image frames having the image pixel data generated at distinct first instants of time during an image capture period from the focal plane array, the processor receiving motion reading(s) captured during the image capture period, the processor converting the motion readings into angular displacement of the focal plane array, and conducting a non-uniform correction on at least one of the image frames by modifying pixel values of the at least one of the image frames based upon the angular displacement of the focal plane array during the image capture period.

2. The camera system of claim 1, wherein the camera system does not include a mechanical shutter controlling light passing between a scene and the focal plane array.

3. The camera system of claim 1, wherein the pixels of the focal plane array convert electromagnetic waves having the wavelength within the range from 800 nanometers to 20 micrometers into an image frame.

4. The camera system of claim 3, wherein the pixels of the focal plane array are microbolometers.

5. The camera system of claim 1, wherein conducting the non-uniform correction on at least one of the image frames includes selecting a non-uniform correction algorithm from a plurality of non-uniform correction algorithms when the angular displacement at a time of image capture is below a threshold.

6. The camera system of claim 1, wherein conducting the non-uniform correction on at least one of the image frames includes selecting a non-uniform correction algorithm from a plurality of non-uniform correction algorithms when the angular displacement at a time of image capture is above a threshold.

7. The camera system of claim 1, wherein conducting the non-uniform correction on at least one of the image frames includes selecting a non-uniform correction algorithm from a plurality of non-uniform correction algorithms when the angular displacement at a time of image capture is less than the angular resolution of the pixel.

8. The camera system of claim 1, wherein the pixels sense image pixel data from electromagnetic waves supplied by the at least one optical element at a first rate, and wherein the motion sensor senses the motion readings at a second rate, and wherein the second rate is faster than the first rate.

9. The camera system of claim 1, wherein the pixels sense image pixel data from the electromagnetic waves supplied by the at least one optical element at a first rate, and wherein the motion sensor senses the motion readings at a second rate, and wherein the second rate is same as the first rate.

10. The camera system of claim 1, wherein the image processing algorithms are selected from a group of algorithms including an enhanced image field of view algorithm, a super resolution algorithm, and an enhanced frame rate algorithm.

11. The camera system of claim 1, wherein the adjacently disposed pixels include individual physical pixels, and wherein the non-uniform correction includes calculating a gain for the individual physical pixels and applying the gain for the individual pixel values when modifying the pixel values of the at least one of the image frames.

12. The camera system of claim 11, wherein the adjacently disposed pixels include individual physical pixels, and wherein the non-uniform correction creates at least one of a gain correction table and a offset correction table for the individual physical pixels, and applies at least one value within the at least one gain correction table and the offset correction table when modifying the pixel values of the at least one of the image frames.

13. The camera system of claim 1, wherein the processor has access to a plurality of non-uniform correction modes, and selects a particular one of the non-uniform correction modes to perform the non-uniform correction on at least one of the image frames, selection of the particular one of the non-uniform correction modes being based upon a magnitude of the angular displacement of the focal plane array during the image capture period.

14. An apparatus, comprising:
    an unmanned aerial system; and a camera system supported by the unmanned aerial system and subject to unplanned angular deviations due to forces acting upon the unmanned aerial system;

at least one optical element having a configuration;

a focal plane array having a plurality of adjacently disposed pixels sensing image pixel data from electromagnetic waves supplied by the at least one optical element on a per-pixel basis at a first rate, the plurality of adjacently disposed pixels having an angular resolution between pixels, the angular resolution being dependent upon the configuration of the at least one optical element and at least one dimension of the pixels, the pixels being configured to detect electromagnetic waves having a wavelength within a range from 800 nanometers to 20 micrometers;

a motion sensor connected to the focal plane array such that movement of the focal plane array matches movement of the motion sensor, the motion sensor sensing angular displacement in three dimensions and providing signals indicative of the angular displacement of the motion sensor at a second rate; and a processor receiving the image pixel data generated at distinct first instants of time during an image capture period from the focal plane array and a plurality of motion readings indicative of the unplanned angular deviations due to forces acting upon the unmanned aerial system during the image capture period, converting the motion readings into angular displacement of the focal plane array, and applying an image enhancement to the image pixel data to generate a composite image or video.

15. The apparatus of claim 14, wherein the image enhancement includes forming a composite image by stitching displaced image pixel data captured at distinct instants of time together.

16. The apparatus of claim 14, wherein the image pixel data has a first resolution of a real world scene, and wherein the image enhancement includes forming a composite image having a second resolution greater than the first resolution by overlaying overlapping portions of multiple displaced image pixel data captured at distinct instants of time, the composite image having a greater number of pixels representing the real world scene than the image pixel data having the first resolution.

17. The apparatus of claim 14, wherein the image enhancement is a nonuniform correction of the image pixel data.

18. The apparatus of claim 14, wherein the image enhancement is an enhanced video frame rate, and wherein the processor is configured to assign multiple motion readings during the image capture period to a group of image pixel data captured at an instant of time.

19. The apparatus of claim 14, wherein the second rate is faster than the first rate.

20. The apparatus of claim 14, wherein the second rate is same as the first rate.

* * * * *

UNITED STATES PATENT AND TRADEMARK OFFICE
CERTIFICATE OF CORRECTION

PATENT NO.        : 10,701,296 B2
APPLICATION NO.   : 16/164528
DATED             : June 30, 2020
INVENTOR(S)       : Matthew Dock, Michael Fox and Jon Stewart Page 1 of 1

It is certified that error appears in the above-identified patent and that said Letters Patent is hereby corrected as shown below:

In the Specification
Column 5, Line 5: Delete ""I")" and replace with -- "/") --

Signed and Sealed this
Eighteenth Day of August, 2020

Andrei Iancu
*Director of the United States Patent and Trademark Office*